US012481171B2

(12) United States Patent
Michaud et al.

(10) Patent No.: US 12,481,171 B2
(45) Date of Patent: Nov. 25, 2025

(54) FRAME FOR SPECTACLES WITH MAGNIFYING LENSES

(71) Applicant: RUDY PROJECT S.P.A., Treviso (IT)

(72) Inventors: David Emmanuel Michaud, Albignasego (IT); Roberto Casarin, Treviso (IT)

(73) Assignee: RUDY PROJECT S.P.A., Treviso (IT)

( * ) Notice: Subject to any disclaimer, the term of this patent is extended or adjusted under 35 U.S.C. 154(b) by 399 days.

(21) Appl. No.: 18/111,162

(22) Filed: Feb. 17, 2023

(65) Prior Publication Data

US 2023/0273453 A1 Aug. 31, 2023

(30) Foreign Application Priority Data

Feb. 25, 2022 (IT) .......................... 102022000003608

(51) Int. Cl.
*G02C 1/04* (2006.01)
(52) U.S. Cl.
CPC ..................... *G02C 1/04* (2013.01)
(58) Field of Classification Search
CPC .. G02C 1/04; G02C 2200/06; G02C 2200/08; G02C 1/10; G02C 7/088; G02B 25/004
See application file for complete search history.

(56) References Cited

U.S. PATENT DOCUMENTS

| 3,838,914 A | * | 10/1974 | Fernandez | ............... | G02C 1/04 |
| | | | | | 351/41 |
| 3,869,200 A | * | 3/1975 | Danylewich | ............. | G02C 1/10 |
| | | | | | 351/85 |
| 4,498,743 A | * | 2/1985 | Feinbloom | ............. | G02B 7/002 |
| | | | | | 351/45 |
| 4,685,782 A | * | 8/1987 | Lhospice | ................. | G02C 1/04 |
| | | | | | 351/41 |

(Continued)

FOREIGN PATENT DOCUMENTS

| CN | 2049368 U | 12/1989 |
| EP | 3933491 A1 | 1/2022 |

(Continued)

OTHER PUBLICATIONS

Guan, Translation of CN 2049368, Dec. 13, 1989 (Year: 1989).*

*Primary Examiner* — Dmitriy Bolotin
(74) *Attorney, Agent, or Firm* — Carmel Patent Agency; Robert Ballarini (57) ABSTRACT

A frame for spectacles with magnifying lenses includes a magnifying eyepiece for mounting on each lens. The frame includes:
a front mount including, for each lens, a respective slot extending between a central region of the nose support mount and an opposite lateral region of the mount, each slot being configured to receive a portion of a respective lens-carrying support, partially surrounding a peripheral edge portion of the lens, and (Continued)

fixing means for fixing the lens-carrying support which is received in the respective slot to the front mount.

The lens-carrying support is received in the corresponding slot with a coupling play transverse to the front mount, and the fixing means are configured to fix each lens-carrying support to the front mount in a preselected relative positioning which is allowed by the coupling play, making the orientation of each lens adjustable with respect to the front mount.

8 Claims, 8 Drawing Sheets

(56) References Cited

U.S. PATENT DOCUMENTS

| | | | | |
|---|---|---|---|---|
| 6,585,370 | B2* | 7/2003 | Zelman | G02C 1/06 |
| | | | | 351/103 |
| 7,384,141 | B2* | 6/2008 | Zelman | G02C 9/00 |
| | | | | 351/140 |
| 7,726,807 | B2* | 6/2010 | Van Atta | G02C 1/04 |
| | | | | 351/103 |
| 9,081,213 | B2* | 7/2015 | Weinberg | G02C 9/04 |
| 9,335,567 | B2* | 5/2016 | Nakamura | A61B 3/111 |
| 9,470,908 | B1* | 10/2016 | Frankel | G02C 5/124 |
| 9,946,095 | B2* | 4/2018 | Orfahli | G02C 1/06 |
| 10,012,846 | B1* | 7/2018 | Santinelli | G02C 1/10 |
| 10,295,842 | B2* | 5/2019 | Giordanetti | G02C 9/04 |
| 10,877,296 | B2* | 12/2020 | Lindsey | G02C 3/04 |
| 11,526,026 | B1* | 12/2022 | Santinelli | G02C 1/04 |
| 2002/0097372 | A1* | 7/2002 | Zelman | G02C 1/06 |
| | | | | 351/57 |
| 2003/0030771 | A1* | 2/2003 | Hursey, Jr. | G02C 7/086 |
| | | | | 351/123 |
| 2003/0038919 | A1* | 2/2003 | Lin | G02C 7/086 |
| | | | | 351/107 |
| 2009/0051866 | A1* | 2/2009 | DiChiara | G02C 1/04 |
| | | | | 351/110 |
| 2009/0231699 | A1* | 9/2009 | Nakamura | G02B 25/004 |
| | | | | 359/481 |
| 2022/0299791 | A1* | 9/2022 | Gao | G02C 11/10 |
| 2023/0273453 | A1* | 8/2023 | Michaud | G02C 1/10 |
| | | | | 351/90 |

FOREIGN PATENT DOCUMENTS

| | | |
|---|---|---|
| JP | S62160418 A | 7/1987 |
| JP | 2017129670 A | 7/2017 |
| JP | 2021110856 A | 8/2021 |

* cited by examiner

FRAME FOR SPECTACLES WITH MAGNIFYING LENSES

FIELD OF THE INVENTION

The present invention concerns a frame for spectacles with magnifying lenses.

BACKGROUND

In some specific sectors, such as for example in the medical or technological field, magnifying spectacles are known to be used, which are configured to enlarge the working view field with magnification systems that help in executing particularly delicate and precise activities. As non-limiting examples of sectors of application in the medical field, mention can be made of the dentistry and surgery sector.

The invention finds particular application in the field of the magnifying spectacles also known as "telescope spectacles", in which there is provision on each lens of the spectacles for a respective magnifying eyepiece to be mounted or integrated, thus making a pair of spectacles having a binocular magnifying system which is configured to magnify the work area that is observed by wearing the spectacles, and looking through the eyepieces, in a similar way to what happens using a conventional binocular.

Typically, magnifying spectacles of the type indicated can provide for the use of frames having substantially traditional shapes and conformations and in which the lenses carrying the magnifying eyepieces can also be made as corrective lenses.

In these spectacles, for a correct vision through the telescope eyepieces it is necessary to be able to adjust the frontal convergence of the two eyepieces, in the same way as what happens using a binocular. Focusing the magnified image requires, in fact, in the binocular vision, an appropriate convergence of the monocular visual directions through the magnifying eyepieces, so as to allow a correct vision of the magnified image present in the fixed point.

In this regard, a known solution provides that the magnifying spectacles comprise a lens-carrying mount including a front beam, for example made from plastic material, having inside it a core made from metal material, which extends between the lens-carrying rims and configured to be deformable, such that by means of such deformation the front angle of convergence of each lens, and therefore of each eyepiece mounted on the corresponding lens can be adjusted. This deformation can be induced by the user himself, in order to reach the preselected angle of convergence for the applied magnifying system.

This system is however rather inconvenient and impractical for the user, besides the fact that it is not particularly precise in imposing the desired angle of convergence.

The main aim of the invention is to provide a frame for spectacles with structurally magnifying lenses and functionally designed so as to allow exceeding the limits complained about with reference to the cited prior art.

SUMMARY

This and other aims which will appear hereinafter are achieved by the invention by means of a frame with magnifying lens made in accordance with the following claims.

In accordance with a first aspect of the invention, a frame for spectacles with magnifying lenses of the type in which there is provision on each lens for a magnifying eyepiece to be mounted, comprises:

a front mount including, for each lens, a respective slot which extends at least at an eyebrow arch zone of the frame, between a central region of the nose support mount and an opposite lateral region of the mount for articulating a respective arm to the frame, each slot being configured to receive at least one portion of a respective lens-carrying support which can support the lens by at least partially surrounding a peripheral edge portion of the lens, fixing means for fixing the lens-carrying support which is received in the respective slot in the front mount, wherein the lens-carrying support is received in the corresponding slot with a coupling play transverse to the front mount and the fixing means are configured to fix each lens-carrying support to the front mount in a preselected relative positioning which is allowed by the coupling play so as to make the orientation of each lens adjustable with respect to the front mount.

In accordance with another aspect of the invention, the fixing means comprise at least one fixing screw which is configured to engage with a screwing action with a threaded hole which is provided in the lens-carrying support, passing through a through-opening which is slotted and formed in the front mount at the corresponding slot so that the screw is engaged in the slotted opening with relative freedom to slide between opposite ends of the slotted opening in order to be gripped in the preselected relative positioning corresponding to the desired orientation of the lens with respect to the mount.

In accordance with another aspect of the invention, for each lens, the coupling play inside the corresponding slot is increasing from the central region of the front mount in the direction of the lateral region and said fixing means comprise a fixing screw which is positioned at the lateral region of the front mount.

In accordance with another aspect of the invention, for each lens, the coupling play inside the corresponding slot is increasing from the lateral region of the front mount in the direction of the central region and the fixing means comprise a fixing screw which is positioned at the central region of the front mount.

In accordance with another aspect of the invention, for each lens, the fixing means comprise a pair of fixing screws which are arranged at the lateral region and the central region of the front mount, respectively.

Preferably the lens-carrying support is made from metal material.

In accordance with another aspect of the invention, the lens-carrying support extends in a frame-like manner, with a closed-contour profile, surrounding the entire peripheral edge of the lens.

In accordance with another aspect of the invention, each slot extends between a pair of opposite lateral walls which are connected to a bottom wall and the lens-carrying support can be fixed in the slot in a plurality of relative positions comprised between a first and a second end position in which the lens-carrying support is in abutment against the one and against the other of the opposite lateral walls, respectively.

In accordance with another aspect of the invention, the slot is configured to have a coupling play which is substantially zero at one of the longitudinal ends thereof and a maximum coupling play at the other of the longitudinal ends, said coupling play being increasing from one end in the direction of the other end so that the lens-carrying support can rotate about the end of the slot having substantially zero coupling play between said first and second position.

BRIEF DESCRIPTION OF THE DRAWINGS

Further characteristics and advantages of the invention will become clearer from the detailed description that follows of some of its preferred embodiment examples illustrated, by way of non-limiting example, with reference to the appended drawings, in which.

DETAILED DESCRIPTION OF THE PREFERRED EMBODIMENTS

With initial reference to FIGS. 1 to 6, a first example of a frame for spectacles 2 with magnifying lenses made in accordance with the present invention is indicated overall with 1.

Figure 1:
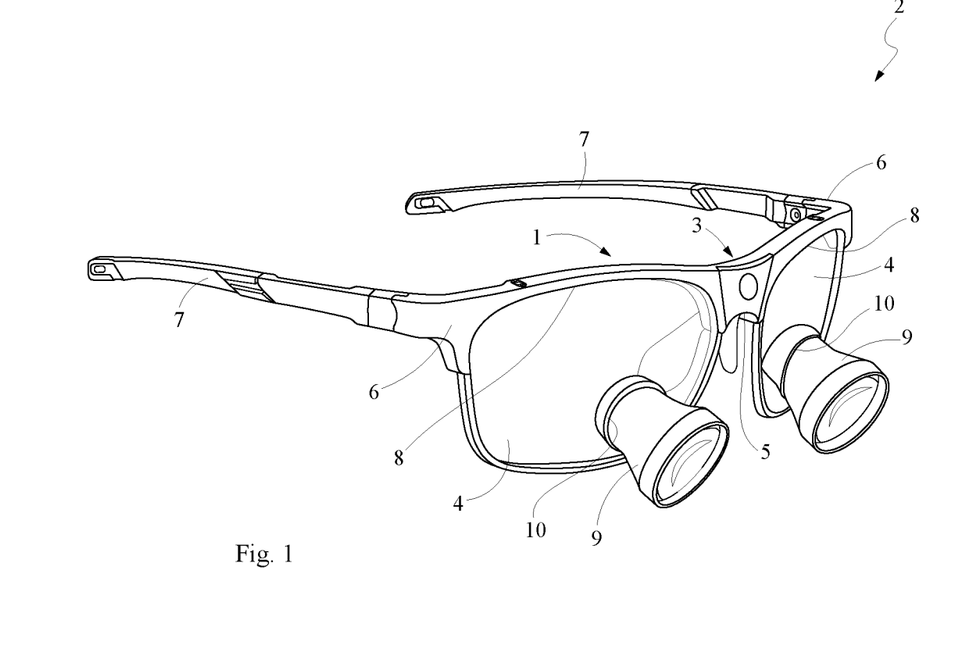
FIG. 1 is a perspective view of a pair of spectacles comprising a frame in accordance with a first embodiment example of the present invention.

The frame 1 comprises a front mount 3 which is configured for holding two respective lenses, both indicated with 4. Between the lenses 4, in the front mount there is identified a central nose support region 5 while at the opposite lateral ends the mount comprises respective lateral regions 6 for the hinged articulation with respective arms 7.

Between each lateral region 6 and the central region 5 there is identified in the front mount 3 of the frame a respective eyebrow arch zone 8.

There is provision on each lens 4 for a respective magnifying eyepiece 9 to be mounted that is conformed as a telescope, which is configured with a system of lens suitable to provide a preset level of magnification.

Each eyepiece 9 is suitably constrained to the corresponding lens 4, for example it is arranged to engage a through opening 10 made through the lens thickness and to be solidly joined to the lens itself at the contour profile of the opening 10.

The provision of the pair of eyepieces 9 therefore makes it possible to realize a binocular configuration in the frame for spectacles according to the invention.

Figure 2:
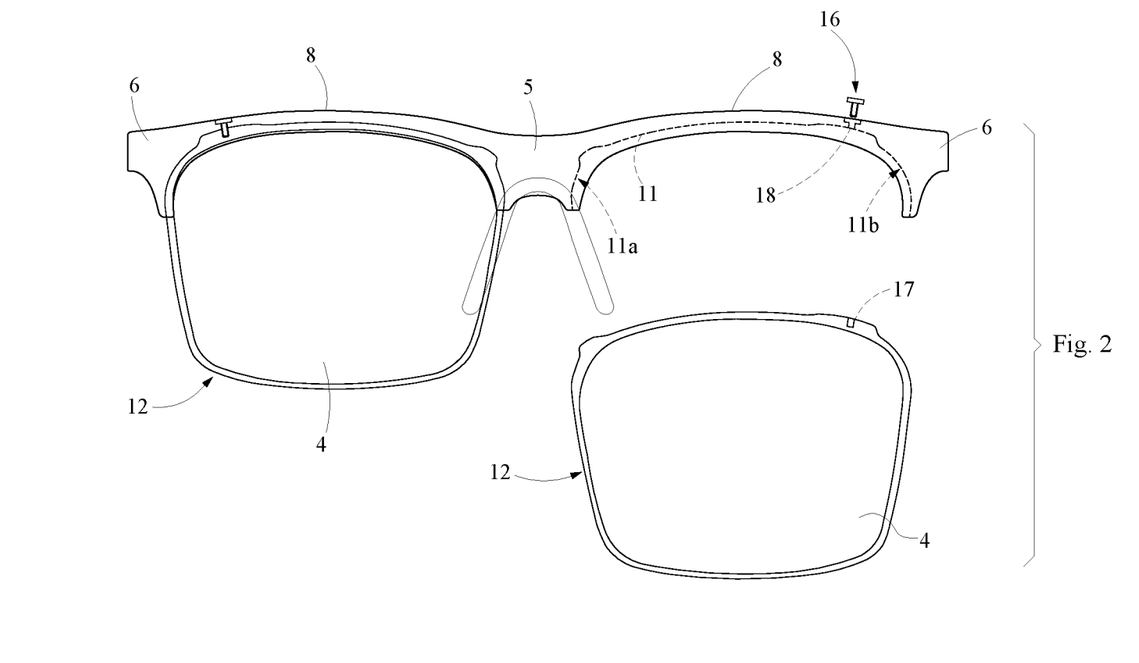
FIG. 2 is a view in front elevation and with detached parts of a detail of the frame of FIG. 1.

For the lenses to be held on the frame, the front mount 3 includes, for each lens 4, a respective seat made in the form of a slot 11 which extends at the eyebrow arch zone 8, between the central region 5 of the mount and the opposite lateral region 6.

Each slot 11 is configured to receive a portion of a respective lens-carrying support 12, which can support the lens 4 by surrounding the entire peripheral edge of the lens, i.e. extending in a frame-like manner, with a closed-contour profile, around the peripheral edge of the lens.

Conveniently, the slot 11 can assume the conformation of a channel with a "C" profile in cross-section, suitable to receive, with a relative coupling action, the lens-carrying support 12.

Preferably the lens-carrying 12 is made from metal material, and further preferably it is made from aluminum or from an alloy thereof.

Each slot 11 is developed along the corresponding eyebrow arch zone 8 between a first end 11a thereof and a second end 11b, longitudinally opposite to each other and located at the central 5 and lateral 6 region of the front mount, respectively.

Each slot 11 develops, between said ends 11a, 11b, between a pair of opposite lateral walls 13, 14 which are connected to a bottom wall 15.

In the following, the coupling of a single lens-carrying 4 support 12 to the corresponding slot 11 will be described in detail, it being understood that this coupling mode is applicable to both lenses of the spectacles.

Figure 3:
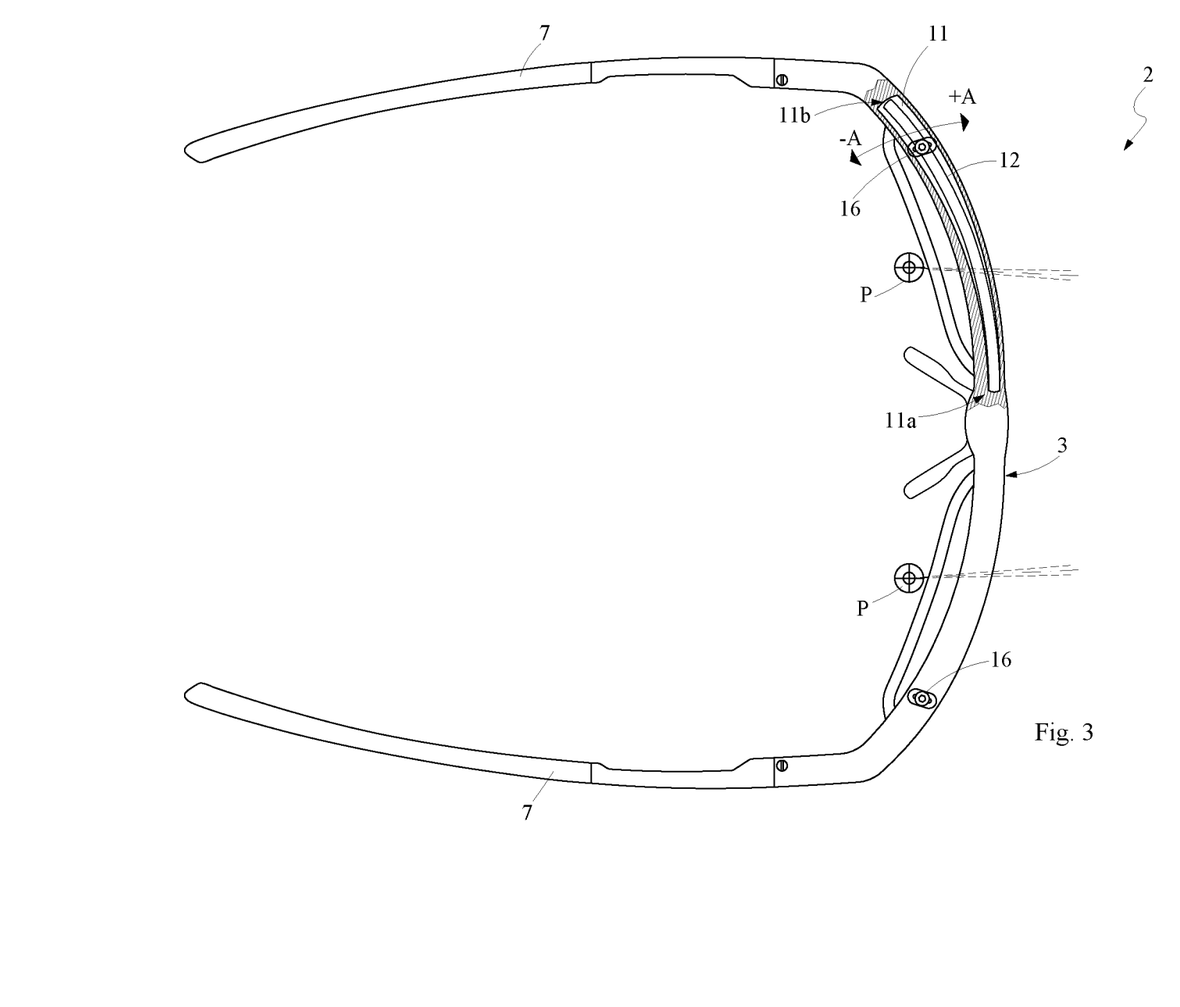
FIG. 3 is a plan view from above and in partial section of the frame of the previous figures.

In accordance with a main feature of the invention, the slot 11 is configured to receive the support 12 therein with a coupling play transverse to the front mount 3, as clearly illustrated in the sectional view of FIG. 3. In this figure, for greater clarity, one of the two slots 11 is shown partially sectioned along the longitudinal development direction, so that the lens-carrying support housed in the slot itself is visible.

The coupling play within the slot 11 is also increasing from the end 11a of the slot, arranged near the central region 5 of the mount where said play is substantially zero or substantially reduced, in the direction of the opposite end 11b, arranged near the lateral region 6 of the mount, where said play assumes its maximum value.

Thanks to the provision of such play, the support portion 12 received in the slot 11 can assume a plurality of positions relatively to the slot, which are reached by oscillating around the end 11a (in which the coupling realizes a sort of virtual rotation pin). This plurality of positions is comprised between a first and a second end position, in which the lens-carrying 12 is in abutment against the lateral wall 13 (FIG. 5) and against the lateral wall 14 of the lens (FIG. 6), respectively. In FIG. 3 the lens-carrying support 12 is depicted in a position comprised between the aforementioned end positions.

There is also provision in the frame 1 for fixing means for fixing the lens-carrying support 12 to the mount 3 in a preselected relative positioning which is allowed by the coupling play with the slot 11.

For each support, said fixing means conveniently comprise a fixing screw 16 which is configured to engage with a screwing action with a threaded blind hole 17 which is provided in the lens-carrying support 12. An opening is marked with 18 which is shaped as a slot passing through the bottom wall 15 of the slot, the width of which is configured to receive the stem of the screw with relative freedom to slide between the opposite ends 18a, 18b of the slot. Said slot 18 is made near the second end 11b of the slot and extends between the ends thereof 18a, 18b in a direction transverse to the front mount, as clearly illustrated in FIGS. 3 and 4. The extension of the slot 18 is furthermore selected so that the lens-carrying support 12 can be gripped against the mount, by screwing the through screw 16 with its stem 16a through the slotted opening 18, in any preselected relative positioning comprised between the end positions depicted respectively in FIGS. 5 and 6.

In accordance with a preferred type for the fixing screw 16, the use of Torx tread screws can be provided.

A superficial lowering of the mount made at the slotted opening is indicated with 19, which is of such width and depth that the head 16b of the screw 16 can remain received within the overall profile of the mount, at the eyebrow arch zone, without protruding beyond the surface profile of the mount itself.

Thanks to the fact that it is possible to vary the positioning of the lens-carrying 12 with respect to the front mount, the orientation of the lens 4 with respect to the mount 3 is therefore adjustable and consequently the convergence between the magnifying eyepieces 9 mounted on the respective lenses is adjustable.

Assuming as the reference position of the support with respect to the mount, that position in which the support is received in the slot in a centered condition, that is, with equal play present between the support and the wall 13 and between the support and the wall 14, from this reference position the support can be rotated (around the virtual pin realized in the end 11a) by an angle A towards the outside of the mount or by an angle A towards the inside of the mount. At the angular rotation of angle A, in one direction and in the opposite direction of rotation, the support reaches the end positions in abutment against the one or the other of the walls 13, 14.

Figure 4:
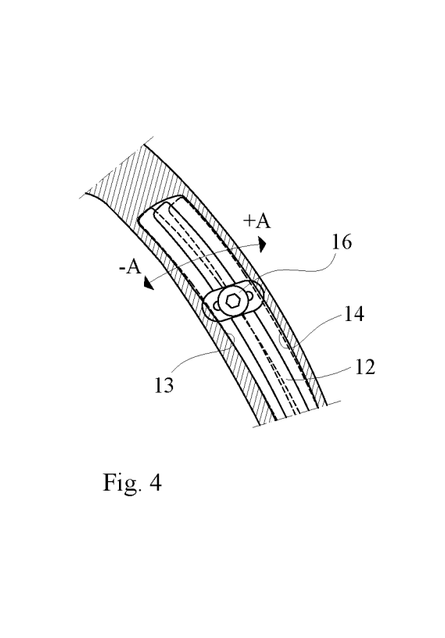
FIG. 4 is a view on enlarged scale and in partial section of a detail of the frame of the previous figures.
Figure 5:
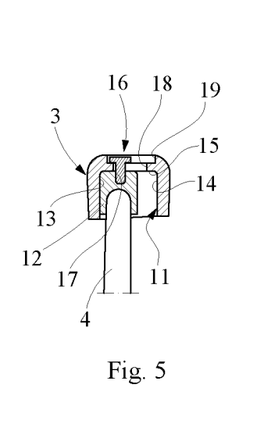
FIGS. 5 and 6 are views on enlarged scale and in cross-section of the detail of FIG. 4, in respective distinct operating configurations.
Figure 6:
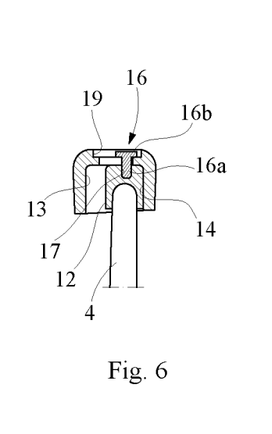

By way of example only, in order to indicate an order of magnitude, a preferred value of the angle A may be selected equal to about 1.5°, and by convention it may be assumed that the angle A of rotation towards the outside of the mount is equal to +1.5° and the angle A of rotation towards the inside of the mount is equal to −1.5°. In FIGS. 3 and 4, the opposite direction arrows depicted near the end 11b mark the directions of rotation of the support with respect to the mount (with angles +A and −A according to the aforementioned convention).

In FIG. 3, the main optical axes, passing through the respective eye pupils, indicated with P, are schematically depicted, with a continuous line, and for each main optical axis the positions assumed by the axis in the angular rotation with angles +A and −A are illustrated, with a dashed line.

The adjustment of the angular orientation of each lens 4 with respect to the mount 3, in the preselected angular range, therefore allows a corresponding adjustment of the convergence of the eyepieces 9, in order to guarantee a correct vision through the magnifying lenses.

FIG. 4 depicts, inside the slot 11, with a dotted line, the contours of the lens-carrying support 12 in the opposite end positions, where it is in abutment against the corresponding lateral walls 13, 14 of the slot. The lens-carrying support 12 is depicted with a continuous line in an intermediate position between the end positions. The angular displacement of the support 12 between the intermediate position and the one or the other of the end positions entails a rotation of the lens of the angle A with respect to the mount, and within this angular excursion, the desired angle of convergence of the magnifying eyepieces can be preselected by the user.

Figure 7:
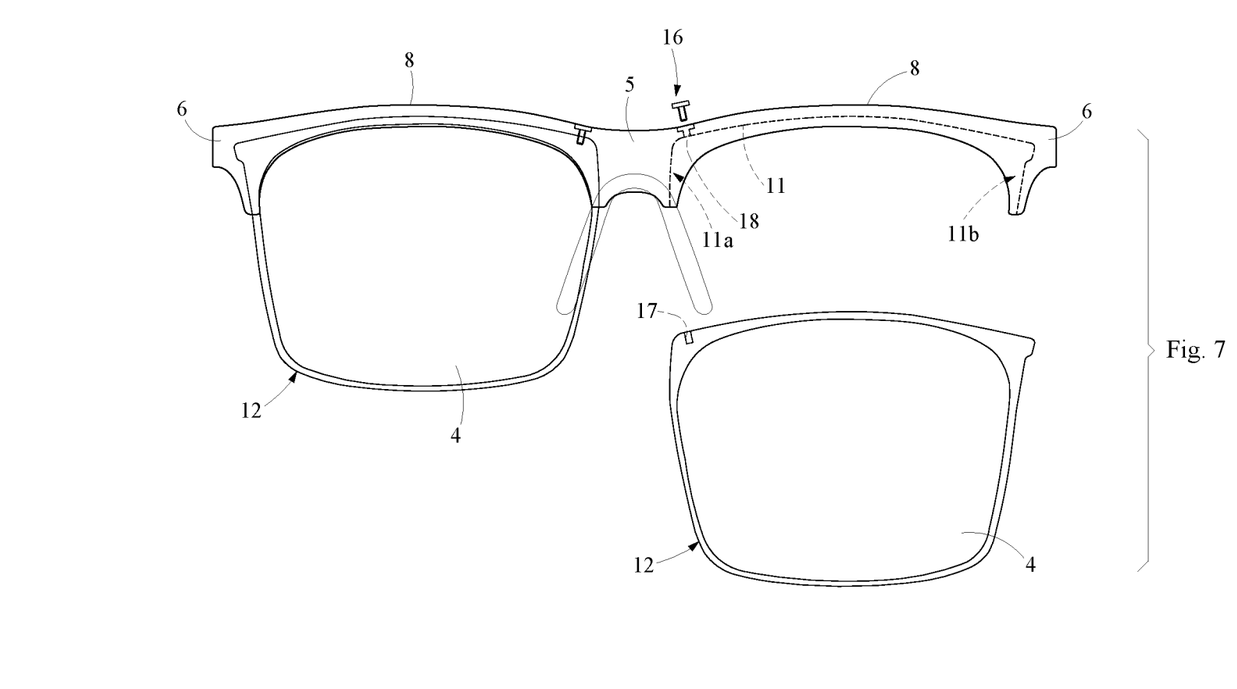
FIG. 7 is a view corresponding to that of FIG. 2 in a second embodiment example of the frame for spectacles of the invention.
Figures 8, 9:
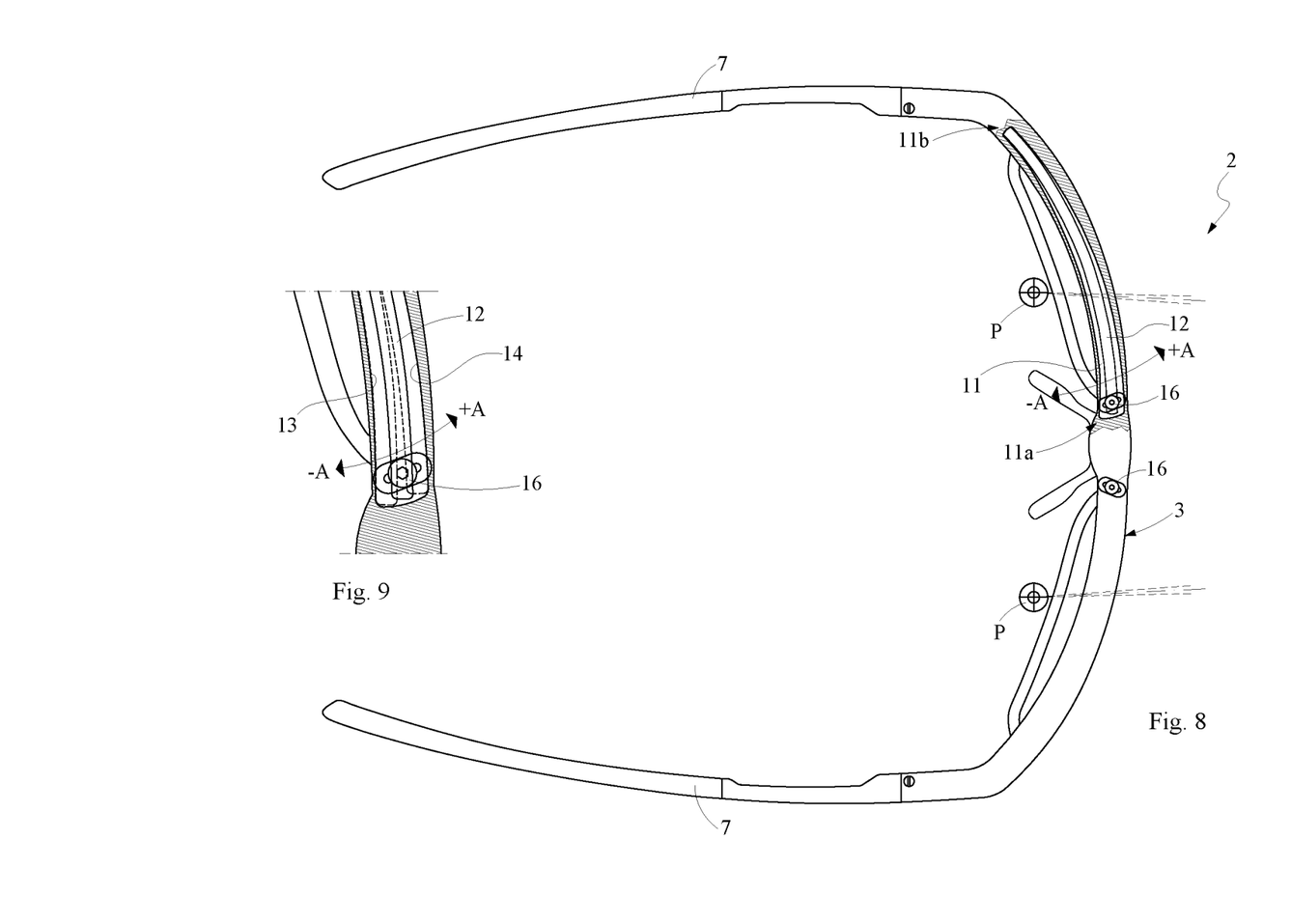
FIG. 8 is a view corresponding to that of FIG. 3 and referred to the second embodiment example of the frame of the invention.
FIG. 9 is a view corresponding to that of FIG. 4 and referred to the second embodiment example of the frame of the invention.

With reference to FIGS. 7 to 9, a second embodiment example of the frame of the invention is described below, in which details analogous to those of the previous example are marked by the same reference numerals.

This second example differs mainly in that the coupling play within the slot 11 is increasing from the end 11b of the slot, near the lateral region 6 of the mount where said play is substantially zero, in the direction of the opposite end 11a, near the central region 5 of the mount, where said play assumes its maximum value.

Thanks to this coupling play, the support portion 12 received in the slot 11 can assume a plurality of positions relatively to the slot, which are reached by oscillating around the end 11b (in which the coupling realizes a sort of virtual rotation pin). This plurality of positions is comprised between a first and a second end position, in which the lens-carrying support 12 is in abutment against the lateral wall 13 and against the lateral wall 14 of the lens, respectively.

In this example, the fixing screw 16 is arranged at the first end 11a of the slot 11 and operates in the same manner as described above to lock the support 12 to the mount 3 in the preselected relative positioning which is allowed by the coupling play with the slot.

Figure 10:
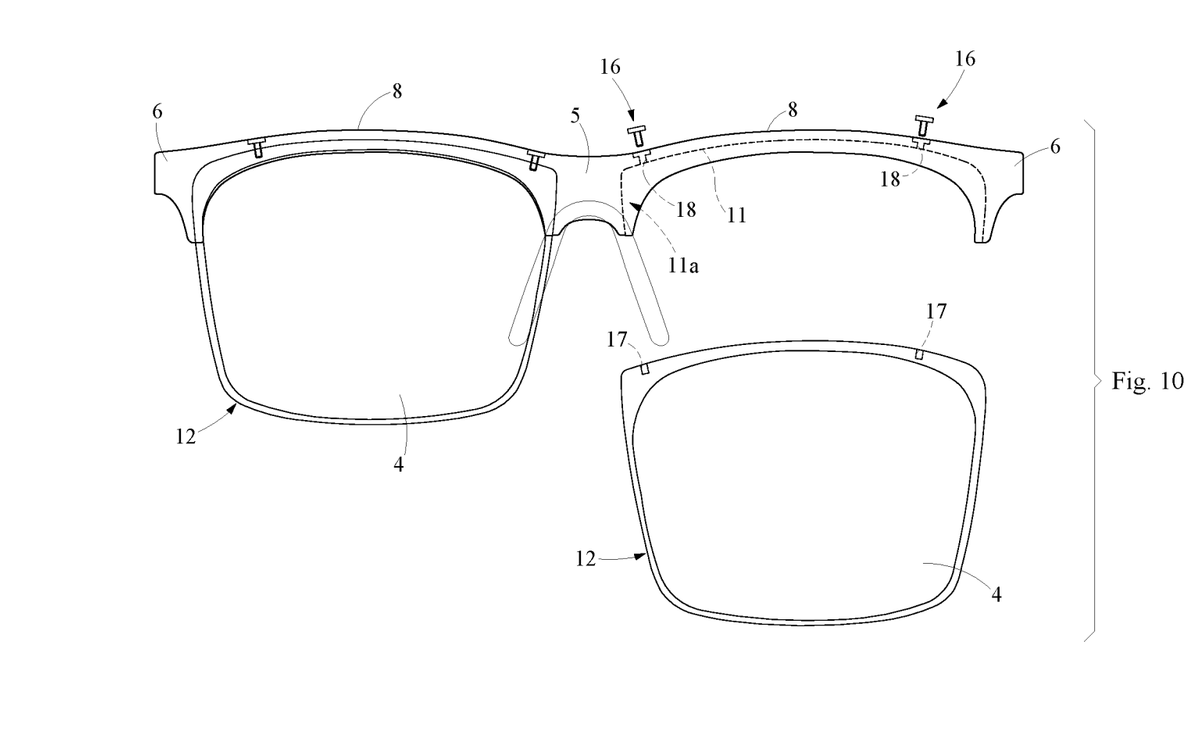
FIG. 10 is a view corresponding to that of FIG. 2 in a third embodiment example of the frame for spectacles of the invention.
Figure 11:
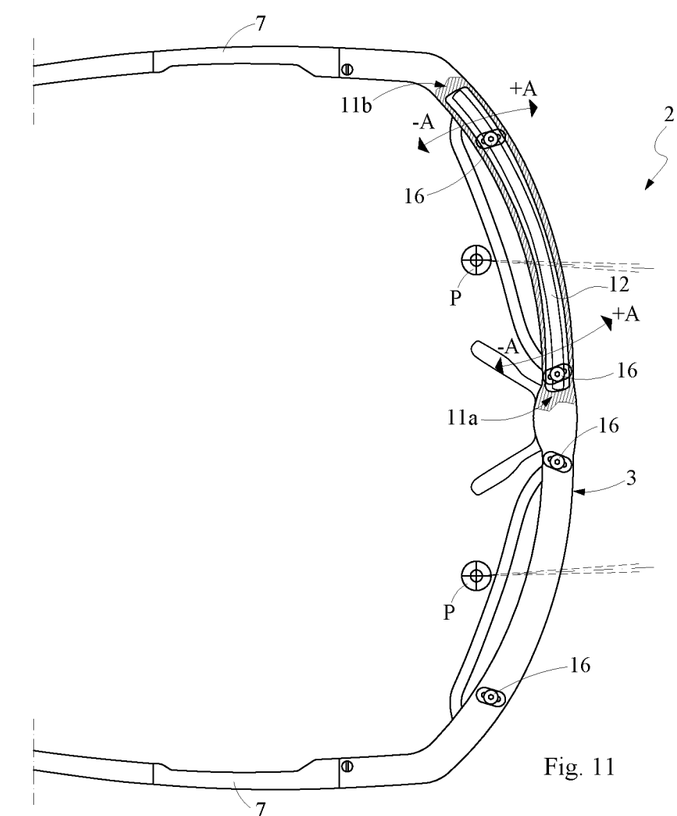
FIG. 11 is a view corresponding to that of FIG. 3 and referred to the third embodiment example of the frame of the invention.
Figure 12:
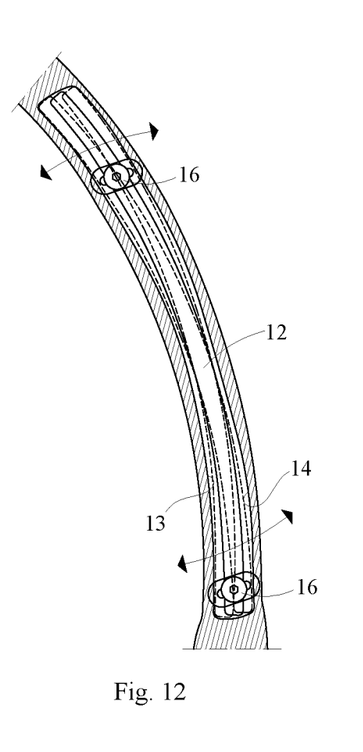
FIG. 12 is a view corresponding to that of FIG. 4 and referred to the third embodiment example of the frame of the invention.

FIGS. 10 to 12 depict a third embodiment example of the frame in accordance with the invention, in which details analogous to those of the previous examples are marked by the same reference numerals. This third example differs mainly in that the coupling play between the lens-carrying and the slot is significantly reduced at a central portion of the slot, interposed between the opposite ends 11a, 11b and is increasing from such a central portion in the direction of both ends 11a, 11b where it reaches the maximum value.

In this example, a pair of fixing screws 16 are provided, which are arranged at the first end 11a, in the central region 5, and at the second end 11b, in the lateral region 6 of the mount, respectively. Each screw 16 operates in the same manner as described above to lock the support to the mount in the preselected relative positioning which is allowed by the coupling play. In this configuration, the lens-carrying support 12 can rotate around the central portion of the slot causing an oscillation of the support, wherein in one of the ends 11a, 11b the support is approached to one of the walls 13, 14 of the slot, while in the other of the ends 11a, 11b the support is approached to the other of the walls 13, 14, such oscillation allowing to reach the preselected relative positioning between lens-carrying support and front mount, such positioning being correlated to the angle of convergence of the lens that is desired by the user.

The invention thus achieves the proposed aim, achieving numerous advantages with respect to the known solutions.

A main advantage lies in the fact that in the frame according to the invention, if it is provided with a system having eyepieces with magnifying lenses, the regulation of the convergence of the eyepieces is convenient and practical for the user, allowing the user to impose a preselected angle of convergence between the eyepieces in an extremely precise way.

The invention claimed is:

1. A frame for spectacles with magnifying lenses, of the type in which there is provision on each lens for a magnifying eyepiece to be mounted, said frame comprising:
   a front mount including, for each lens, a respective slot which extends at least at an eyebrow arch zone of the frame, between a central region of a nose support mount and an opposite lateral region of the front mount for articulating a respective arm to the frame, each slot being configured to receive at least one portion of a respective lens-carrying support which can support the lens by at least partially surrounding a peripheral edge portion of the lens, fixing means for fixing the lens-carrying support which is received in the respective slot to the front mount, wherein the lens-carrying support is received in the corresponding slot with a coupling play transverse to the front mount and said fixing means are configured to fix each lens-carrying support to the front mount in a preselected relative positioning which is allowed by the coupling play so as to make the orientation of each lens adjustable with respect to the front mount, wherein said fixing means comprise at least one fixing screw which is configured to engage with a screwing action with a threaded hole which is provided in the lens-carrying support, passing through a through-opening which is slotted and formed in the front mount at the corresponding slot so that the screw is engaged in the slotted opening with relative freedom to slide between opposite ends of said slotted opening in order to be gripped in the preselected relative positioning corresponding to the desired orientation of the lens with respect to the mount.

2. The frame for spectacles according to claim 1, wherein, for each lens, the coupling play inside the corresponding slot increases from the central region of the front mount in a direction of the lateral region and said fixing means comprise a fixing screw which is positioned at the lateral region of the front mount.

3. The frame for spectacles according to claim 1, wherein, for each lens, the coupling play inside the corresponding slot is increasing from the lateral region of the front mount in the direction of the central region and said fixing means comprise a fixing screw which is positioned at the central region of the front mount.

4. The frame for spectacles according to claim 1, wherein, for each lens, said fixing means comprise a pair of fixing screws which are arranged at the lateral region and the central region of the front mount, respectively.

5. The frame for spectacles according to claim 1, wherein said lens-carrying support is made from metal material.

6. The frame for spectacles according to claim 1, wherein said lens-carrying support extends in a frame-like manner, with a closed-contour profile, surrounding an entire peripheral edge of the lens.

7. A frame for spectacles with magnifying lenses, of the type in which there is provision on each lens for a magnifying eyepiece to be mounted, said frame comprising:

a front mount including, for each lens, a respective slot which extends at least at an eyebrow arch zone of the frame, between a central region of a nose support mount and an opposite lateral region of the front mount for articulating a respective arm to the frame, each slot being configured to receive at least one portion of a respective lens-carrying support which can support the lens by at least partially surrounding a peripheral edge portion of the lens, fixing means for fixing the lens-carrying support which is received in the respective slot to the front mount, wherein the lens-carrying support is received in the corresponding slot with a coupling play transverse to the front mount and said fixing means are configured to fix each lens-carrying support to the front mount in a preselected relative positioning which is allowed by the coupling play so as to make the orientation of each lens adjustable with respect to the front mount, wherein each slot extends between a pair of opposite lateral walls which are connected to a bottom wall and the lens-carrying support can be fixed in the slot in a plurality of relative positions between a first and a second end position in which the lens-carrying support is in abutment against the one and against the other of the opposite lateral walls, respectively.

8. The frame for spectacles according to claim 7, wherein the slot is configured to have a coupling play which is substantially zero at one of the longitudinal ends thereof and a maximum coupling play at the other of the longitudinal ends, said coupling play being increasing from one end in the direction of the other end so that the lens-carrying support can rotate about the end of the slot having substantially zero coupling play between said first and second position.

* * * * *